(12) United States Patent
Shi et al.

(10) Patent No.: US 11,062,453 B2
(45) Date of Patent: Jul. 13, 2021

(54) METHOD AND SYSTEM FOR SCENE PARSING AND STORAGE MEDIUM

(71) Applicant: BEIJING SENSETIME TECHNOLOGY DEVELOPMENT CO., LTD., Beijing (CN)

(72) Inventors: Jianping Shi, Beijing (CN); Hengshuang Zhao, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 122 days.

(21) Appl. No.: 16/385,333

(22) Filed: Apr. 16, 2019

(65) Prior Publication Data

US 2019/0244358 A1 Aug. 8, 2019

Related U.S. Application Data

(63) Continuation of application No. PCT/CN2017/114254, filed on Dec. 1, 2017.

(30) Foreign Application Priority Data

Dec. 2, 2016 (CN) .......................... 201611097445.1
Dec. 2, 2016 (CN) .......................... 201611097543.5

(51) Int. Cl.
*G06T 7/11* (2017.01)
*G06N 3/08* (2006.01)
(Continued)

(52) U.S. Cl.
CPC ............... *G06T 7/11* (2017.01); *G06K 9/00* (2013.01); *G06K 9/00664* (2013.01);
(Continued)

(58) Field of Classification Search
CPC .. G06T 7/11; G06T 7/187; G06K 9/00; G06K 9/00664; G06K 9/4604; G06K 9/4628; G06K 9/66; G06N 3/08
See application file for complete search history.

(56) References Cited

U.S. PATENT DOCUMENTS 5,790,758 A 8/1998 Streit
9,436,895 B1 9/2016 Jones et al.
(Continued)

FOREIGN PATENT DOCUMENTS

CN 104933420 A 9/2015
CN 105488515 A 4/2016
(Continued)

OTHER PUBLICATIONS

Bu, Shuhui, Han, Pegncheng, Liu, Zhenbao, Han, Junwei "Scene parsing using inference Embedded Deep Neural Networks" Pattern Recognition. Feb. 2016. (Year: 2016).*
(Continued)

*Primary Examiner* — Kim Y Vu
*Assistant Examiner* — Molly Delaney
(74) *Attorney, Agent, or Firm* — Syncoda LLC; Feng Ma (57) ABSTRACT

A method for scene parsing includes: performing a convolution operation on a to-be-parsed image by using a deep neural network to obtain a first feature map, the first feature map including features of at least one pixel in the image; performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result including a category of the at least one pixel in the image.
(Continued)

A system for scene parsing and a non-transitory computer-readable storage medium can facilitate realizing the method.

20 Claims, 7 Drawing Sheets (51) Int. Cl.
    *G06K 9/46*         (2006.01)
    *G06K 9/66*         (2006.01)
    *G06T 7/187*       (2017.01)
    *G06K 9/00*         (2006.01)

(52) U.S. Cl.
    CPC ......... *G06K 9/4604* (2013.01); *G06K 9/4628* (2013.01); *G06K 9/66* (2013.01); *G06N 3/08* (2013.01); *G06T 7/187* (2017.01)

(56) References Cited

U.S. PATENT DOCUMENTS

| | | | |
|---|---|---|---|
| 9,471,844 | B2 | 10/2016 | Saitwal et al. |
| 10,242,289 | B2* | 3/2019 | Cricri .................. G06K 9/4628 |
| 2005/0197983 | A1 | 9/2005 | Tani |
| 2011/0058747 | A1* | 3/2011 | Nakagomi ............... G06K 9/46 |
| | | | 382/195 |
| 2015/0104102 | A1 | 4/2015 | Carreira et al. |
| 2017/0220904 | A1 | 8/2017 | Bai et al. |
| 2019/0385044 | A1* | 12/2019 | Fujimura ............. G06N 3/0454 |

FOREIGN PATENT DOCUMENTS

| | | | |
|---|---|---|---|
| CN | 105512624 | A | 4/2016 |
| CN | 105550746 | A | 5/2016 |
| CN | 105701507 | A | 6/2016 |
| CN | 105787500 | A | 7/2016 |
| CN | 105787510 | A | 7/2016 |
| CN | 105868785 | A | 8/2016 |
| CN | 105917354 | A | 8/2016 |
| CN | 105956560 | A | 9/2016 |
| CN | 105976400 | A | 9/2016 |
| CN | 105989336 | A | 10/2016 |
| CN | 106156748 | A | 11/2016 |
| CN | 106156807 | A | 11/2016 |

OTHER PUBLICATIONS

International Search Report in the international application No. PCT/CN2017/114254, dated Mar. 2, 2018.
J. Long, E Shelhamer, and T. Darrell. Fully convolutional networks for semantic segmentation. In CVPR, pp. 3431-3440, 2015.
L. Chen, G. Papandreou, I. Kokkinos, K. Murphy, and A. L. Yuille. Semantic image segmentation with deep convolutional nets and fully connected crfs. CoRR, abs/1412.7062, 2014.
W. Liu, A. Rabinovich, and A. C. Berg. Parsenet: Looking wider to see better. CoRR, abs/1506.04579, 2015.
Pyramid Scene Parsing Network.
Yandong Li."Survey of convolutional neural network"; Joural of Computer Applications; Sep. 10, 2016.
Donahue J et al. "DeCAF: a deep convolutional activation feature for generic visual recognition"; Computer Science; Dec. 31, 2013.
First Office Action of the Chinese application No. 201611097445.1, dated Jan. 19, 2020.
Second Office Action of the Chinese application No. 201611097543.5, dated Aug. 28, 2020.
English translation of the Written Opinion of the International Search Authority in the international application No. PCT/CN2017/114254, dated Mar. 2, 2018.
Overview of scene image classification techniques adapted from Science China Press / Li, Xuelong Shi, Jianhua Dong, Yongsheng Tao, Dacheng, published on Jun. 10, 2015.
Scene understanding based on Multi-Scale Pooling of deep learning features adapted from 2015 International Conference on Automation, Mechanical Control and Computational Engineering / DongYang Li Yue Zhou, published on Jan. 31, 2015.
Pyramid Scene Parsing Network, Hengshuang Zhao, Jianping Shi, et al, published on Apr. 27, 2017.
Shuhui Bu et al. "Scene parsing using inference Embedded Deep Networks" Pattern Recognition, Feb. 4, 2016.
Third Office Action of the Chinese application No. 201611097543.5, dated Mar. 23, 2021.

* cited by examiner

METHOD AND SYSTEM FOR SCENE PARSING AND STORAGE MEDIUM

CROSS-REFERENCE TO RELATED APPLICATIONS

The present application is a continuation of International Application No. PCT/CN2017/114254 filed on Dec. 1, 2017, which claims priority to Chinese Patent Application No. CN 201611097543.5 filed on Dec. 2, 2016 and Chinese Patent Application No. CN 201611097445.1 filed on Dec. 2, 2016, the contents of which are hereby incorporated by reference in their entireties.

BACKGROUND

Scene parsing refers to assigning, based on semantic segmentation, a category to each pixel in an image describing a scene, and tagging different colors for different categories. Scene parsing is a basis of target recognition, image retrieval, video annotation, and the like. In recent years, it has become a research focus in the field of computer vision.

SUMMARY

The present disclosure relates to computer vision technologies, and in particular, to a method for scene parsing, a system for scene parsing, and a non-transitory computer-readable storage medium.

Embodiments of the present disclosure provide a technical solution for performing scene parsing on in image.

According to a first aspect of the embodiments of the present disclosure, there is provided a method for scene parsing, including: performing a convolution operation on a to-be-parsed image by using a deep neural network to obtain a first feature map, the first feature map including features of at least one pixel in the image; performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result including a category of the at least one pixel in the image.

According to a second aspect of the embodiments of the present disclosure, there is provided a system for scene parsing, including: a memory storing processor-executable instructions; and a processor arranged to execute the stored processor-executable instructions to perform steps of: performing a convolution operation on a to-be-parsed image to obtain a first feature map, the first feature map comprising features of at least one pixel in the image; performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result comprising a category of the at least one pixel in the image.

According to a third aspect of the embodiments of the present disclosure, there is provided a non-transitory computer-readable storage medium having stored thereon computer-readable instructions that, when executed by a processor, cause the processor to execute a method for scene parsing, the method including: performing a convolution operation on a to-be-parsed image by using a deep neural network to obtain a first feature map, the first feature map comprising features of at least one pixel in the image; performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result comprising a category of the at least one pixel in the image.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known computing systems, environments, and/or configurations suitable for use together with the computer systems, the servers, and the terminal devices include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer systems, the servers, and the terminal devices may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

Figure 1:
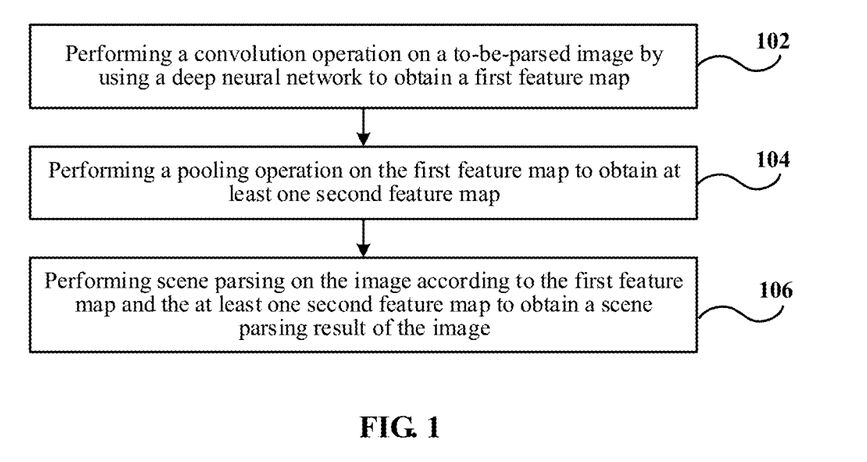
FIG. 1 is a flowchart of an embodiment of a method for scene parsing according to the present disclosure.

FIG. 1 is a flowchart of an embodiment of a method for scene parsing according to the present disclosure. As shown in FIG. 1, the method for scene parsing according to this embodiment includes:

102, a convolution operation is performed on a to-be-parsed image by using a deep neural network, and features of at least one pixel in the image on which scene parsing is to be performed are extracted to obtain a first feature map.

The first feature map includes the features of the at least one pixel in the image. For example, the first feature map includes features of each pixel in the image.

In an optional example, the operation 102 is performed by a processor by invoking a corresponding instruction stored in a memory, or is performed by a feature extraction unit run by the processor.

104, a pooling operation is performed on the first feature map to obtain at least one second feature map.

Each second feature map includes a plurality of features. Each feature in the second feature map is obtained by performing a pooling operation on the first feature map, the second feature map has a size greater than that of the first feature map, then an image area corresponding to each feature in the second feature map is greater than an image area corresponding to each feature in the first feature map, the features in the second feature map reflect context information of one or more pixels in the corresponding area in the image, and thus, context information such as semantic context information and spatial context information of the image area corresponding to each feature can be learned based on the second feature maps.

In an optional example, the operation 104 is performed by a processor by invoking a corresponding instruction stored in a memory, or is performed by a pooling unit run by the processor.

106, scene parsing is performed on the image according to the first feature map and the at least one second feature map to obtain a scene parsing result of the image, where the scene parsing result includes a category of the at least one pixel in the image, for example, the scene parsing result includes a category of each pixel in the image.

In an optional example, the operation 106 is performed by a processor by invoking a corresponding instruction stored in a memory, or is performed by a classification layer run by the processor.

The applicant has found through research that in a scene parsing task, each pixel relies heavily on surrounding information. According to the embodiments of the present disclosure, during the process of performing scene parsing on the image, the first feature map includes the features of the at least one pixel in the image, the second feature map is obtained by performing a pooling operation on the first feature map and has a size greater than that of the first feature map, then an image area corresponding to each feature in the second feature map is greater than an image area corresponding to each feature in the first feature map, and thus, the features in the second feature map reflect context information (such as semantic context information and/or spatial context information) of at least one pixel in the corresponding area in the image. Therefore, according to the embodiments of the present disclosure, during scene parsing on the image, not only semantic information of the pixels but also context information such as semantic context information and/or spatial context information of different pixels in the whole image are considered, so that the categories of the pixels are predicted more accurately, thereby effectively improving the accuracy of the scene parsing result.

In a possible application, the number of the second feature maps obtained in the operation 104 is one or more. If there is a plurality of second feature maps, different second feature maps in the plurality of second feature maps have different sizes. The sizes of the plurality of second feature maps increase sequentially, so as to form a pyramid structure. Thus, the second feature maps of the pyramid structure include information of at least one pixel (for example, each pixel) in the whole image in different receptive fields of vision when the sizes change sequentially, and according to the first feature map and the second feature maps of the pyramid structure, and based on the features of the at least one pixel in the image and the information of the at least one pixel in the different receptive fields of vision, scene parsing is performed on the image, so that the categories of the pixels are predicted more accurately.

If there is a plurality of second feature maps, in one optional example, the operation 104 is implemented in the following way: performing, by using a first pooling layer in the deep neural network, downsampling on the first feature map separately with a plurality of pooling windows having different sizes, such as, pooling windows having sizes of 1*1, 2*2, 3*3, and 6*6, to generate a plurality of second feature maps, each second feature map including a plurality of features, and each feature being used for representing context information (such as semantic context information and/or spatial context information) of different pixels in the corresponding area in the image.

In addition, if there is one second feature map, in one optional example, the operation 104 is also implemented in the same way: performing, by using the first pooling layer in the deep neural network, downsampling on the first feature map with pooling windows having set sizes to generate one second feature map, where the second feature map includes a plurality of features, and each feature is used for representing semantic context information, spatial context information, and the like of the pixels in the corresponding area in the image.

Figure 2:
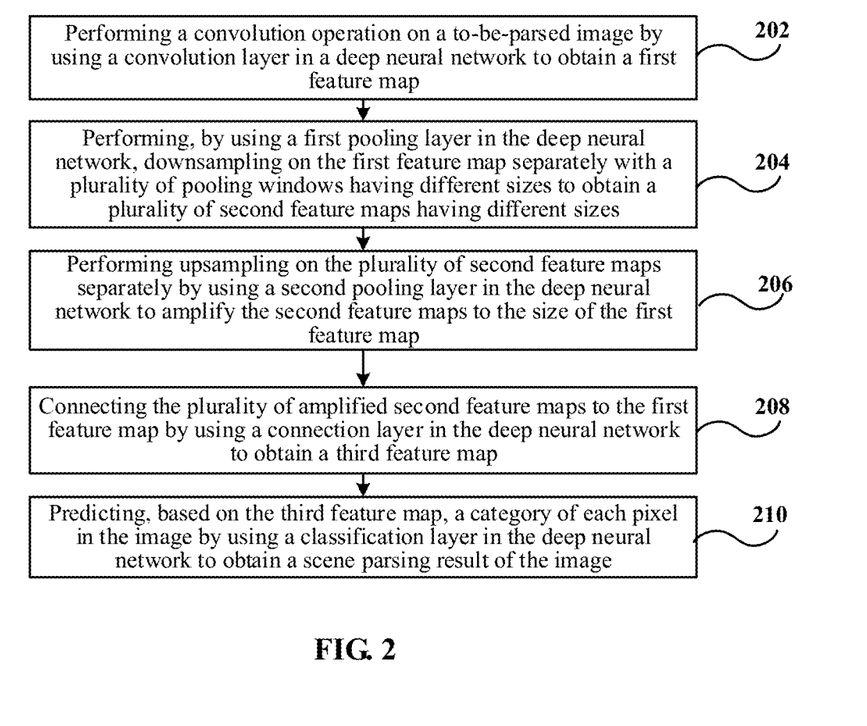
FIG. 2 is a flowchart of another embodiment of the method for scene parsing according to embodiments of the present disclosure.

FIG. 2 is a flowchart of another embodiment of the method for scene parsing according to embodiments of the present disclosure. As shown in FIG. 2, compared with the embodiment shown in FIG. 1, the method for scene parsing according to this embodiment includes:

202, a convolution operation is performed on a to-be-parsed image by using a convolution layer in a deep neural network, and convolution features of the to-be-parsed image are extracted to obtain a first feature map, the first feature map including the convolution features of each pixel in the image.

In an optional example, the operation 202 is performed by a processor by invoking a corresponding instruction stored in a memory, or is performed by a feature extraction unit run by the processor.

204, downsampling (max pooling) is performed, by using a first pooling layer in the deep neural network, on the first feature map separately with a plurality of pooling windows having different sizes, such as, pooling windows having sizes of 1*1, 2*2, 3*3, and 6*6, to obtain a plurality of second feature maps having different sizes.

The second feature maps include a plurality of features, downsampling is performed with each pooling window to obtain one feature, and each feature separately represents context information (such as semantic context information and/or spatial context information) of each pixel in the corresponding area in the image. Thus, context information such as semantic context information and/or spatial context information of the image area corresponding to each feature can be learned based on the second feature maps.

The plurality of second feature maps is sorted sequentially according to the sizes, so as to form a pyramid structure. Thus, the second feature maps of the pyramid structure include information of each pixel in the whole image in different receptive fields of vision when the sizes change sequentially, and according to the first feature map and the second feature maps of the pyramid structure, and based on the features of each pixel in the image and the information of each pixel in the different receptive fields of vision, scene parsing is performed on the image, so that the categories of the pixels are predicted more accurately.

In an optional example, the operation 204 is performed by a processor by invoking a corresponding instruction stored in a memory, or is performed by a pooling unit run by the processor or the first pooling layer in the pooling unit.

206, upsampling is performed on the plurality of second feature maps separately by using a second pooling layer in the deep neural network to amplify the second feature maps to the size of the first feature map, so as to determine correspondences between the second feature maps and the first feature map in the position of each pixel on the image.

In an optional example, the operation 206 is performed by a processor by invoking a corresponding instruction stored in a memory, or is performed by a pooling unit run by the processor or the second pooling layer in the pooling unit.

208, the plurality of amplified second feature maps are connected to the first feature map, for example, in a direction perpendicular to the pooling windows by using a connection layer in the deep neural network to obtain a third feature map.

Thus, the third feature map includes features of each original pixel in the image and a series of features of each pixel in the corresponding image area.

In an optional example, the operation 208 is performed by a processor by invoking a corresponding instruction stored in a memory, or is performed by a pooling unit run by the processor or the connection layer in the pooling unit.

210, based on the third feature map, a category of each pixel in the image is predicted by using a classification layer in the deep neural network to obtain a scene parsing result of the image.

The scene parsing result includes the category of each pixel in the image.

In an optional example, the operation 210 is performed by a processor by invoking a corresponding instruction stored in a memory, or is performed by a classification layer run by the processor.

In addition, in the embodiment shown in FIG. 2, the first feature map, the second feature maps, and the third feature map also include features of at least one pixel (i.e., some pixels) in the image, so as to predict the category of the at least one pixel in the image based on the third feature map to obtain the scene parsing result of the image.

In the embodiments of the present disclosure, scene parsing is performed based on the third feature map generated according to the first feature map of the image and the plurality of second feature maps distributed in the pyramid structure, identification of category information of each pixel is based on not only information of the current pixel but also information of each pixel in the whole image in the different receptive fields of vision, so that the category of each pixel is predicted more accurately, and compared with a conventional technology for category prediction based on only the information of the current pixel, the accuracy of the scene parsing result is effectively improved.

It has been shown through experiments that based on the method for scene parsing according to the embodiments of the present disclosure, scene parsing is performed on an image including a bed sheet and a pillow of which colors and textures are similar, and the obtained scene parsing result is basically consistent with scene parsing tagging information, so as to effectively avoid the problem of a prediction failure in an image caused by similar colors and textures.

Figure 3:
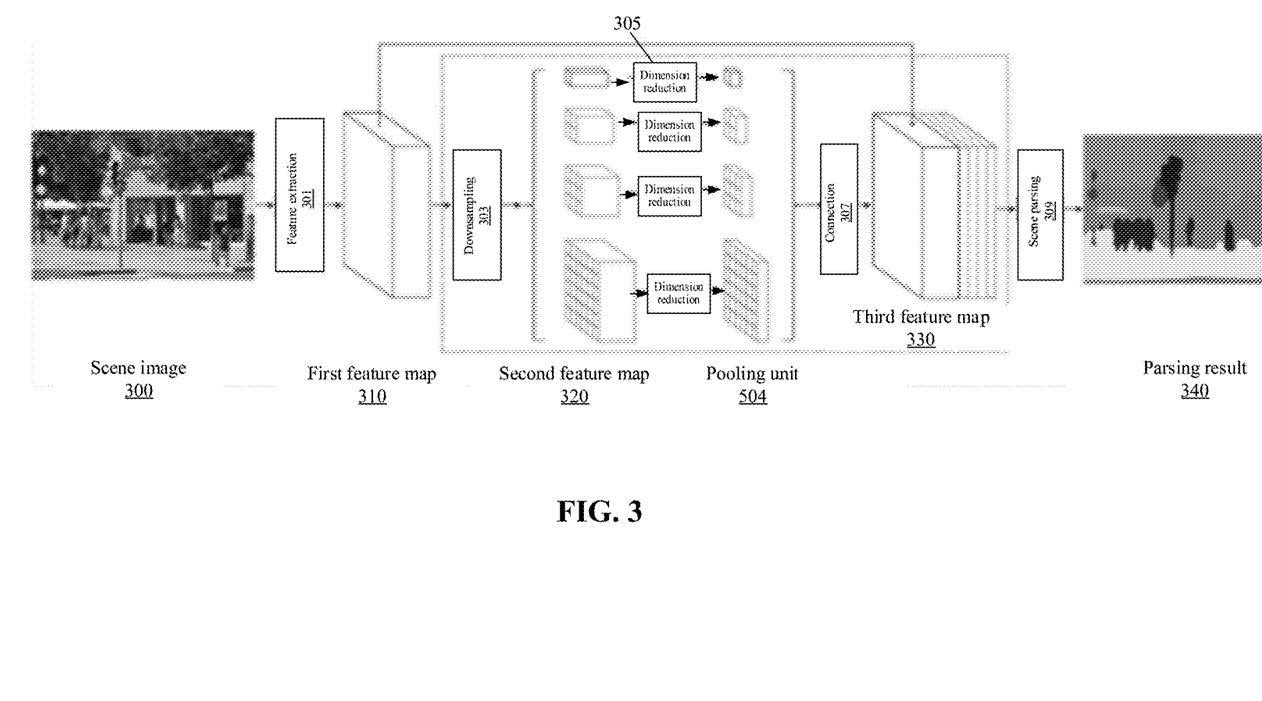
FIG. 3 is an application example drawing of the method for scene parsing according to the embodiments of the present disclosure.

FIG. 3 is an application example drawing of the method for scene parsing according to the embodiments of the present disclosure, and exemplarily shows a process example for processing an image based on the embodiments of the present disclosure.

In addition, in the method for scene parsing according to the embodiments of the present disclosure, after the second feature maps are generated, dimension reduction processing is performed on each second feature 320 map through a convolution layer in a deep neural network. In an optional example, the operation is performed by a processor by invoking a corresponding instruction stored in a memory, or is performed by a pooling unit 504 run by the processor or a convolution layer in the pooling unit 504. Accordingly, in subsequent operations, scene parsing is performed on the image in combination with the first feature map and at least one dimension-reduced second feature map.

So-called feature dimension reduction refers to representing a high dimension by using one low-dimensional feature. Optionally, according to the embodiments of the present disclosure, feature dimension reduction is performed by means of feature selection and feature extraction. The features included in the second feature map 320 serve as high-dimensional features, and thus when feature dimension reduction is performed by means of feature selection, one subset is selected from the high-dimensional features included in the second feature map 320 to serve as new features. When feature dimension reduction is performed by means of feature extraction, the high-dimensional features included in the second feature map 320 are mapped to a low dimension through a preset function to serve as new features.

After the second feature maps 320 are obtained, if there are too many feature dimensions of the second feature maps 320, excessive complexity is usually caused during feature matching, and computing resources are consumed. In the embodiments of the present disclosure, before the first feature map 310 is connected 305 to the second feature maps 320, dimension reduction 303 is performed on the second feature maps 320, so as to improve feature matching efficiency, thereby saving computing resources, and to avoid a small impact of the features (i.e., the features of the at least one pixel) in the first feature map on network parameter adjustment during the training back propagation process of a deep neural network model caused by too high dimension of the features in the second feature maps (global features of a scene image), thereby effectively ensuring the impact of the features in the first feature map on the network parameter adjustment during the training back propagation process of the deep neural network model.

Furthermore, before the method for scene parsing according to the foregoing embodiments of the present disclosure, based on a sample image, network training is performed on the initially set deep neural network model by using an error back propagation method to obtain the deep neural network used in the embodiments of the present disclosure. In an optional example, the network training operations on the deep neural network model are performed by a processor by invoking corresponding instructions stored in a memory, or are performed by a network training unit run by the processor.

For a neural network, it can be found that the expression ability and performance of the network increase with the decrease of the depth of the network. However, the network is not the deeper the better. In addition to computation costs, if the network is relatively deep, the continuation of the increase in the number of network layers may deteriorate the performance of the network instead of improving the performance of the network. In addition, for a very deep neural network, due to the disappearance of a gradient, etc., how to train a very deep neural network is always a problem troubling people.

During the process of implementing the present disclosure, the inventor has found through research that a problem existing in a deep neural network is the degradation of the training of the neural network because of a difficulty in optimal optimization of the structure due to a difficulty in forward error propagation caused by excessive depth of the network. That is, the performance of the network decreases with the increase of the depth of the network. For example, the training error and test error of a 56-layer neural network are both greater than those of a 20-layer neural network.

The sample image in the embodiments of the present disclosure is an image having an accurate scene parsing result artificially tagged in advance, where the artificially tagged scene parsing result is referred to as scene parsing tagging information in the embodiments of the present disclosure, and can serve as a standard for evaluating the accuracy of the scene parsing prediction result output by the corresponding network layers in the deep neural network model.

The number of the network layers of the deep neural network model is N, where the value of N is an integer greater than 2. If the value of N is relatively large, the deep neural network is relatively deep. That is, the neural network is a deep neural network. In practical application, the value of the number N of the network layers in the deep neural network is relatively large, and is generally tens, hundreds, or even thousands.

Figure 4:
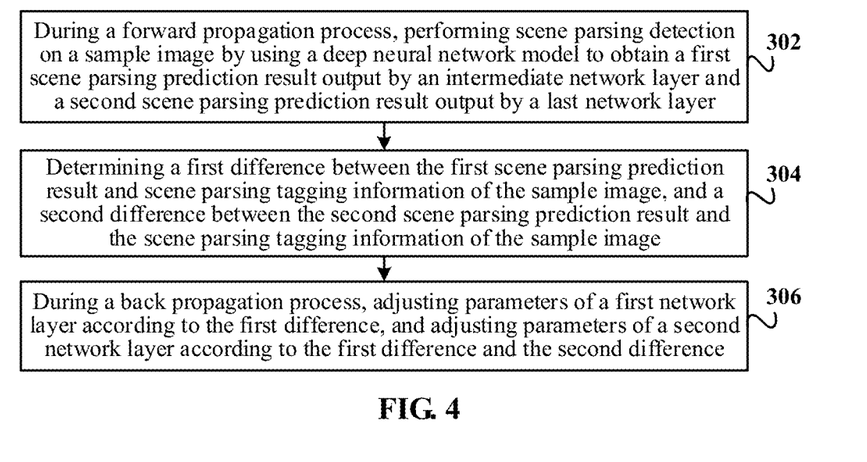
FIG. 4 is a flowchart of an embodiment of performing network training on an initial deep neural network model in the embodiments of the present disclosure.

The value of N is relatively large. For example, if the value is a preset value N0, the neural network is a deep neural network. The value of N0 is set according to actual situations and is updated according to requirements. With reference to FIG. 4, an embodiment of performing network training on an initial deep neural network model in the embodiments of the present disclosure includes the following operations:

302, during a forward propagation process, scene parsing detection is performed on a sample image by using a deep neural network model to obtain a first scene parsing prediction result output by an intermediate network layer of the deep neural network model and a second scene parsing prediction result output by a last network layer.

In the embodiments of the present disclosure, the intermediate network layer includes a plurality of network layers in the deep neural network model, where network layers, of which parameters are adjusted, corresponding to different intermediate network layers are different.

In an optional example, the operation 302 is performed by a processor by invoking a corresponding instruction stored in a memory, or is separately performed by an intermediate network layer and a last network layer of a deep neural network model run by the processor.

304, a first difference (which can be represented as loss 1) between the first scene parsing prediction result and scene parsing tagging information of the sample image, and a second difference (which can be represented as loss 2) between the second scene parsing prediction result and the scene parsing tagging information of the sample image are determined.

In an optional example, the operation 304 is performed by a processor by invoking a corresponding instruction stored in a memory, or is performed by an obtaining subunit run by the processor.

306, during a back propagation process, parameters of a first network layer are adjusted according to the first difference, and parameters of a second network layer are adjusted according to the first difference and the second difference.

The first network layer includes at least one network layer in the deep neural network model that is located between the intermediate network layer and the last network layer, and the second network layer includes at least one network layer other than the first network layer in the deep neural network model.

In an optional example, the operation 306 is performed by a processor by invoking a corresponding instruction stored in a memory, or is performed by a parameter adjustment subunit run by the processor.

In an optional example, the operations in the foregoing embodiment shown in FIG. 4 are performed by a processor by invoking corresponding instructions stored in a memory, or are performed by a network training unit run by the processor.

The network training process of a deep neural network model generally includes multiple iterative trainings till a predetermined training completion condition is satisfied, for example, the first difference and/or the second difference satisfies a preset difference threshold, or the number of the iterative trainings reaches a preset number threshold. The process of each iterative training is divided into two stages: forward propagation and back propagation. If no opposite descriptions are provided, in the embodiments of the present disclosure, the first network, the intermediate network layer, and the last network layer relate to sorting the network layers in the deep neural network model in a forward propagation direction of the network training.

According to the embodiments of the present disclosure, during the process of network training of the deep neural network model, the first difference between the first scene parsing prediction result output by the intermediate network layer of the deep neural network model and the scene parsing tagging information of the sample image is introduced; based on the first difference and the second difference between the second scene parsing prediction result output by the last network layer and the scene parsing tagging information of the sample image, parameters of at least one network layer in the deep neural network model that is located between the intermediate network layer and the last network layer are optimized in combination; based on the second difference, parameters of network layers other than the first network layer in the deep neural network model are adjusted, and therefore, the intermediate network layer and the network layers prior to the intermediate network layer can be monitored better, so that the deep neural network model is optimized more thoroughly, thereby obtaining a better network model optimization result.

In addition, in a possible application, the number of the intermediate network layer is specifically one or more. According to actual requirements, one intermediate network layer is provided in the deep neural network model, or the number L of intermediate network layers required is determined according to the number N of network layers of the deep neural network model subjected to network training, where the value of L is an integer greater than 0 and less than N. The intermediate network layer is represented as the $M^{th}$ layer in the deep neural network model in the forward propagation direction, where the value of M is an integer greater than 2 and less than N. It is specified that the greater the number N of the network layers of the deep neural network model, i.e., the deeper the network, the greater the number of the intermediate network layers. If there is a plurality of intermediate network layers, the network layers of the deep neural network model, of which parameters are adjusted, corresponding to different intermediate network layers are different.

The applicant has found through research that if the value of M is relatively small, the number of the network layers of the deep neural network model prior to the intermediate network layer is relatively small, the deep neural network formed by the first network layer to the intermediate network layer is too shallow, the expression ability of the network is limited, and the effect of training the at least one network layer between the intermediate network layer and the last network layer through the first difference may be poor, thereby limiting the auxiliary training effect of the first difference. With this regard, in an optional example of the present disclosure, the value of M is, for example, greater than N/2. That is, one intermediate network layer is provided in the second half of the deep neural network model in the forward propagation direction. For example, in an optional application, the intermediate network layer in the embodiments of the present disclosure is disposed subsequent to a pooling layer and configured to perform scene parsing detection on feature maps output by the pooling layer.

In an optional example of the embodiments of the method for neural network training according to the present disclosure, in the operation 306 of the embodiment shown in FIG. 4, adjusting parameters of a second network layer according to the first difference and the second difference is, for example, implemented in the following way:

determining different weights W1 and W2 respectively for the first difference and the second difference; and adjusting the parameters of the second network layer according to the first difference and the weight W1 thereof as well as the second difference and the weight W2 thereof.

Optionally, in practical applications, the weight W1 of the first difference is set to be less than the weight W2 of the second difference, i.e., the ratio of W1 to W2 is greater than 0 and less than 1, so as to achieve a leading role of the first difference in the network optimization on the deep neural network model, and the network optimization on the deep neural network model is assisted by the first difference, so as to ensure the optimization effect of the whole deep neural network model on the whole.

In one optional example of the embodiments of the method of the present disclosure, the intermediate network layer is, for example, an auxiliary classification layer, and the first scene parsing prediction result includes a scene classification prediction result of at least one pixel in the sample image output by the auxiliary classification layer. Furthermore, the auxiliary classification layer is removed after the network training of the deep neural network model is completed to simplify a network structure.

In another optional example of the embodiments of the method of the present disclosure, in the operation 304, when the first difference between the first scene parsing prediction result and the scene parsing tagging information of the sample image is determined, a first classification cost function layer is, for example, used to obtain a difference between the first scene parsing prediction result and a scene classification prediction result of the at least one pixel in the sample image in the scene parsing tagging information to serve as the first difference.

The first classification cost function layer is removed after the network training of the deep neural network model is completed.

In another optional example of the embodiments of the method of the present disclosure, the second scene parsing prediction result includes a scene classification prediction result of the at least one pixel in the sample image output by the last network layer.

Accordingly, in the operation 304, when the second difference between the second scene parsing prediction result and the scene parsing tagging information of the sample image is determined, a second classification cost function layer is optionally used to obtain a difference between the second scene parsing prediction result and the scene classification prediction result of the at least one pixel in the sample image in the scene parsing tagging information to serve as the second difference.

Likewise, the second classification cost function layer is removed after the network training of the deep neural network model is completed.

Exemplarily, the first classification cost function layer and the second classification cost function layer are, for example, any one of a softmax regression loss function, an entropy function, or a Support Vector Machine (SVM) cost function.

In one specific example of the embodiments of the method for deep neural network training, the operation 302, performing scene parsing detection on a sample image by using a deep neural network model to obtain a first scene parsing prediction result output by an intermediate network layer is specifically implemented in the following way:

performing a convolution operation on a sample image by using a deep neural network model to obtain a first feature map, the first feature map including features of at least one pixel in the sample image; and according to the first feature map, performing scene parsing detection on the sample image by using the intermediate network layer to obtain a first scene parsing prediction result of the sample image, and outputting the first scene parsing prediction result, where the first scene parsing prediction result includes a category of the at least one pixel in the sample image.

In one specific example of the embodiments of the method for deep neural network training, in the operation 302, performing scene parsing detection on a sample image by using a deep neural network model to obtain a second scene parsing prediction result output by a last network layer is specifically implemented in the following way:

performing a convolution operation on a sample image by using a deep neural network model to obtain a first feature map, the first feature map including features of at least one pixel in the sample image;

performing a pooling operation on the first feature map to obtain at least one second feature map, where a size of the second feature map is less than that of the first feature map; and performing scene parsing detection on the sample image according to the first feature map and the at least one second feature map to obtain a second scene parsing prediction result of the sample image, and outputting the second scene parsing prediction result through a last network layer, where the second scene parsing prediction result includes the category of the at least one pixel in the sample image.

Each second feature map includes a plurality of features. Each feature in the second feature map is obtained by performing a pooling operation on the first feature map, the second feature map has a size greater than that of the first feature map, then a sample image area corresponding to each feature in the second feature map is greater than a sample image area corresponding to each feature in the first feature map, the features in the second feature map reflect context information (such as semantic context information and/or spatial context information) of at least one pixel in the corresponding area in the sample image, and thus, context information such as semantic context information and spatial context information of the sample image area corresponding to each feature can be learned based on the second feature maps.

In the embodiment of performing network training on the deep neural network model in the embodiments of the present disclosure, the content the same as or similar to that in the embodiments of the method for scene parsing can be implemented by using a corresponding implementation in the embodiments of the method for scene parsing, and details are not described here again.

Figure 5:
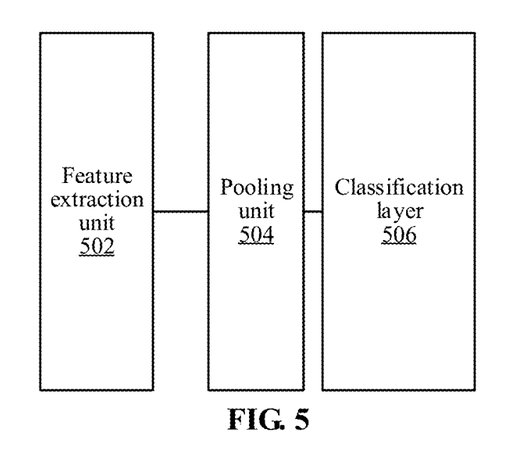
FIG. 5 is a schematic structural diagram of an embodiment of a system for scene parsing according to the present disclosure.

FIG. 5 is a schematic structural diagram of an embodiment of a system for scene parsing according to the present disclosure. An apparatus for scene parsing according to this embodiment can be configured to implement the foregoing embodiments of the method for scene parsing according to the present disclosure. As shown in FIG. 5, the system for scene parsing includes a feature extraction unit 502, a pooling unit 504, and a classification layer 506.

The feature extraction unit 502 is configured to perform a convolution operation on a to-be-parsed image to obtain a first feature map, the first feature map including features of at least one pixel in the image. The feature extraction unit 502 is optionally a convolution layer.

The pooling unit 504 is configured to perform a pooling operation on the first feature map to obtain at least one second feature map, a size of the second feature map being less than that of the first feature map.

Each second feature map includes a plurality of features. Each feature in the second feature map is obtained by performing a pooling operation on the first feature map, the second feature map has a size greater than that of the first feature map, then an image area corresponding to each feature in the second feature map is greater than an image area corresponding to each feature in the first feature map, the features in the second feature map reflect context information (such as semantic context information and/or spatial context information) of at least one pixel in the corresponding area in the image, and thus, context information such as semantic context information and spatial context information of the image area corresponding to each feature can be learned based on the second feature maps.

In a possible application, the number of the generated second feature maps is one or more. If there is a plurality of second feature maps, different second feature maps in the plurality of second feature maps have different sizes. The sizes of the second feature maps increase sequentially, so as to form a pyramid structure. Thus, the second feature maps of the pyramid structure include information of at least one pixel in the whole image in different receptive fields of vision when the sizes change sequentially, and according to the first feature map and the second feature maps of the pyramid structure, and based on the features of the at least one pixel in the image and the information of the at least one pixel in the different receptive fields of vision, scene parsing is performed on the image, so that the category of the at least one pixel is predicted more accurately.

The classification layer 506 is configured to perform scene parsing on the image according to the first feature map and the second feature map to obtain a scene parsing result of the image, the scene parsing result including a category of the at least one pixel in the image.

During the process of performing scene parsing on the image by the system for scene parsing according to the embodiments of the present disclosure, the first feature map includes the features of the at least one pixel in the image, the second feature map is obtained by performing a pooling operation on the first feature map and has a size less than that of the first feature map, then an image area corresponding to each feature in the second feature map is greater than an image area corresponding to each feature in the first feature map, and thus, the features in the second feature map reflect context information (such as semantic context information and/or spatial context information) of the corresponding area in the image. Therefore, according to the embodiments of the present disclosure, during scene parsing on the image, not only semantic information of the at least one pixel but also context information such as semantic context information and/or spatial context information of different areas in the whole image are considered, so that the categories of the pixels are predicted more accurately, and compared with a conventional technology for category prediction based on only the information of the current pixel, the accuracy of the scene parsing result is effectively improved.

Figure 6:
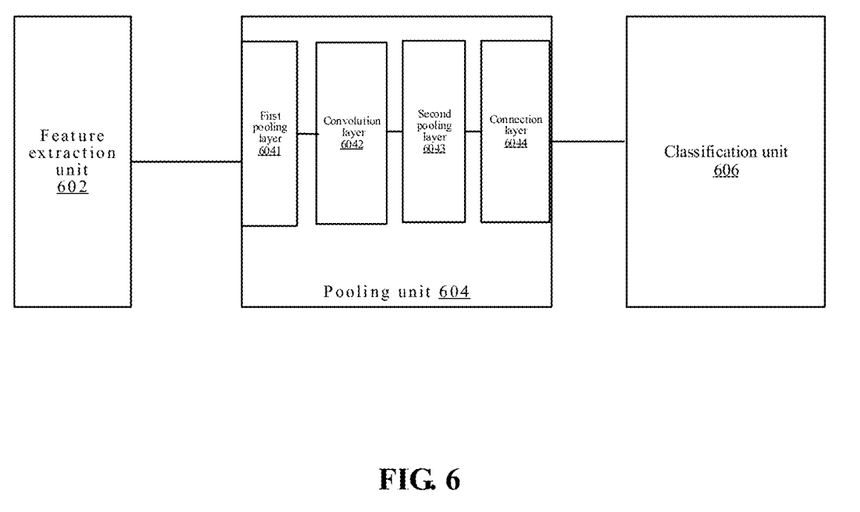
FIG. 6 is a schematic structural diagram of another embodiment of the system for scene parsing according to the present disclosure.

FIG. 6 is a schematic structural diagram of another embodiment of the system for scene parsing according to the present disclosure. As shown in FIG. 6, compared with the embodiment shown in FIG. 5, in this embodiment, the pooling unit 604 optionally includes a first pooling layer 6041 configured to perform downsampling on the first feature map to obtain second feature maps, where the second feature maps include a plurality of features, downsampling is performed once with each pooling window to obtain one feature, and each feature separately represents context information (such as semantic context information and/or spatial context information) of at least one pixel in the corresponding area in the image. Thus, semantic context information, spatial context information, and the like of the pixels in the corresponding area in the image can be learned based on the second feature maps.

The number of the first pooling layer 6041 is one or more. If there is a plurality of first pooling layers, the pooling windows of the plurality of first pooling layers have different sizes, and downsampling is performed on the first feature map with pooling windows having set sizes to obtain a plurality of second feature maps. If there is one first pooling layer, downsampling is performed on the first feature map separately with a plurality of pooling windows having different sizes to obtain a plurality of second feature maps.

In addition, with reference to FIG. 6 again, in still another embodiment, the pooling unit 604 further includes a convolution layer 6042 configured to perform dimension reduction processing on the second feature maps. Accordingly, in this embodiment, the classification layer is configured to perform scene parsing on the image according to the first feature map and the dimension-reduced second feature maps.

Furthermore, with reference to FIG. 6 again, in another embodiment, the pooling layer further includes a second pooling layer 6043 and a connection layer 6044.

The second pooling layer 6043 is configured to perform upsampling on the at least one second feature map separately to amplify the second feature maps to the size of the first feature map, so as to determine correspondences between the second feature maps and the first feature map on the position of each pixel in the image.

The connection layer 6044 is configured to connect the amplified second feature maps to the first feature map, for example, in a direction perpendicular to the pooling windows to obtain a third feature map.

Accordingly, in this embodiment, the classification layer is optionally configured to predict a category of at least one pixel in the image based on the third feature map to generate a scene parsing result of the image, where the scene parsing result include a category of the at least one pixel in the image.

In one optional example of the embodiments of the present disclosure, the system for scene parsing according to the foregoing embodiments is implemented through a deep neural network model. The deep neural network model further includes an intermediate network layer and a last network layer, and is configured to perform scene parsing detection on a sample image during a forward propagation process of network training, a first scene parsing prediction result is output through the intermediate network layer of the deep neural network model, and a second scene parsing prediction result is output through the last network layer of the deep neural network model.

Furthermore, in the system for scene parsing according to the foregoing embodiments of the present disclosure, a network training unit is further provided and configured to perform, based on a sample image, network training on an initially set deep neural network model by using an error back propagation method to obtain the deep neural network. In the embodiments of the present disclosure, the network training unit implements the network training of the deep neural network model based on any one of the methods or a method obtained from a combination thereof described in the foregoing embodiments of the present disclosure. Details are not described here again.

For example, in one optional example, the network training unit includes an obtaining subunit and a parameter adjustment subunit.

The obtaining subunit is configured to determine a first difference between the first scene parsing prediction result and the scene parsing tagging information of the sample image, and a second difference between the second scene parsing prediction result and the scene parsing tagging information of the sample image.

The parameter adjustment subunit is configured, during a back propagation process, to adjust parameters of a first network layer according to the first difference, and to adjust parameters of a second network layer according to the first difference and the second difference, where the first network layer includes at least one network layer in the deep neural network model that is located between the intermediate network layer and the last network layer, and the second network layer includes at least one network layer other than the first network layer in the deep neural network model.

Exemplarily, the number of the intermediate network layer is one or more. According to actual requirements, only one intermediate network layer is provided in the deep neural network model, or the number L of intermediate network layers required is determined according to the number N of network layers of the deep neural network model subjected to network training, where the value of L is an integer greater than 0 and less than N If there is a plurality of intermediate network layers, the network layers of the deep neural network model, of which parameters are adjusted, corresponding to different intermediate network layers are different. It is specified that the greater the number N of the network layers of the deep neural network model, i.e., the deeper the network, the greater the number of the intermediate network layers. The intermediate network layer is represented as the $M^{th}$ layer in the deep neural network model in the forward propagation direction, where the value of M is an integer greater than 2 and less than N.

In addition, in one optional example, when adjusting the parameters of each second network layer according to the first difference and the second difference, the parameter adjustment subunit is configured to determine different weights for the first difference and the second difference, and to adjust the parameters of the second network layer according to the first difference and the weight thereof as well as the second difference and the weight thereof.

In a possible application, it is determined that the weight of the first difference is less than the weight of the second difference.

In addition, in another optional example, the intermediate network layer is specifically an auxiliary classification layer, and the auxiliary classification layer is removed after the network training of the deep neural network model is completed to simplify a network structure. Accordingly, in this embodiment, the first scene parsing prediction result includes a scene classification prediction result of at least one pixel in the sample image output by the auxiliary classification layer.

In still another example, the obtaining subunit includes a first classification cost function layer and a second classification cost function layer, and the first classification cost function layer and the second classification cost function layer are removed after the network training of the deep neural network model is completed.

The first classification cost function layer is, for example, configured to obtain a difference between the first scene parsing prediction result and a scene classification prediction result of the at least one pixel in the sample image in the scene parsing tagging information to serve as the first difference. The second classification cost function layer is configured to obtain a difference between the second scene parsing prediction result and the scene classification prediction result of the at least one pixel in the sample image in the scene parsing tagging information to serve as the second difference. Accordingly, in this embodiment, the second scene parsing prediction result includes a scene classification prediction result of the at least one pixel in the sample image output by the last network layer.

Exemplarily, the first classification cost function layer and/or the second classification cost function layer are specifically implemented through, for example, a softmax loss function, an entropy function, or an SVM cost function.

Optionally, in the foregoing embodiments, the feature extraction unit is further configured to perform a convolution operation on a sample image to obtain a first feature map, the first feature map including features of at least one pixel in the sample image. Accordingly, the intermediate network layer is configured to perform scene parsing detection on the sample image according to the first feature map to obtain a first scene parsing prediction result of the sample image, and to output the first scene parsing prediction result, the first scene parsing prediction result including a category of the at least one pixel in the sample image.

Optionally, the pooling unit is further configured to perform a pooling operation on the first feature map of the sample image to obtain at least one second feature map, a size of the second feature map being less than that of the first feature map. Accordingly, the last network layer is configured to perform scene parsing detection on the sample image according to the first feature map and the at least one second feature map to obtain a second scene parsing prediction result of the sample image, and to output the second scene parsing prediction result, the second scene parsing prediction result including the category of the at least one pixel in the sample image.

Exemplarily, the last network layer includes the classification layer.

Optionally, the system for scene parsing according to the embodiments of the present disclosure is an apparatus having a data processing function, and for example, includes, but is not limited to, an Advanced RISC Machine (ARM), a Central Processing Unit (CPU), or a Graphics Processing Unit (GPU).

In addition, the embodiments of the present disclosure further provide an electronic device, which, for example, is a mobile terminal, a Personal Computer (PC), a tablet computer, a server, or the like. The electronic device is provided with the system for scene parsing according to any one of the embodiments of the present disclosure.

Optionally, an electronic device according to one embodiment of the present disclosure includes a processor and a memory;

where the memory is configured to store at least one executable instruction, and the executable instruction enables the processor to perform corresponding operations of the method for scene parsing according to any one of the embodiments of the present disclosure.

In addition, the embodiments of the present disclosure further provide an electronic device, including:

a processor and the system for scene parsing according to any one of the embodiments of the present disclosure;

where when the system for scene parsing is run by the processor, the units in the system for scene parsing according to any one of the embodiments of the present disclosure are run.

The electronic device provided in the foregoing embodiments of the present disclosure includes the forgoing data processing system according to the present disclosure, and thus includes the system for scene parsing provided in any one of the forgoing embodiments of the present disclosure. The category of at least one pixel is predicted more accurately, and a possible problem of a category prediction error occurring in category prediction based on only the information of the current pixel can be effectively avoided, thereby improving the accuracy of the scene parsing result.

Figure 7:
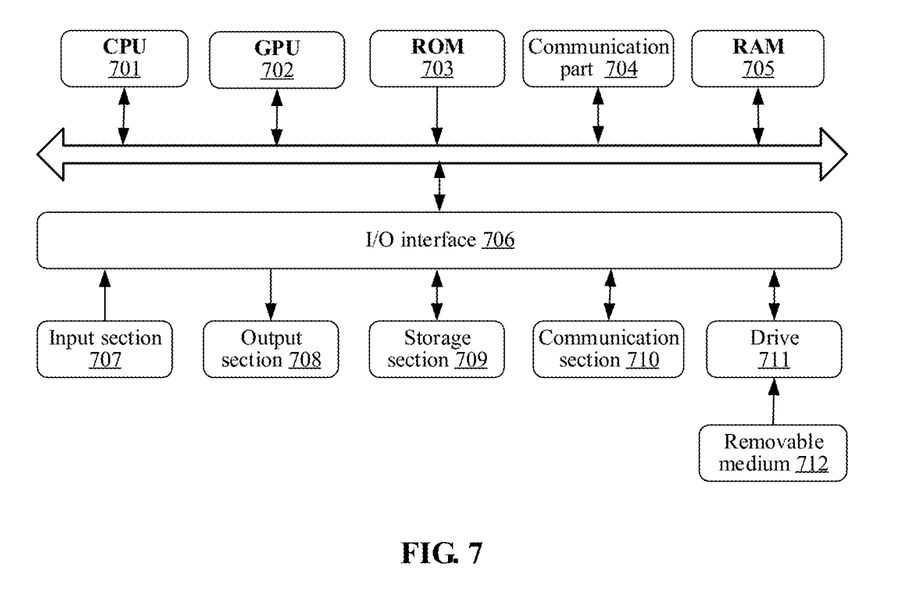
FIG. 7 is a schematic structural diagram of an application embodiment of an electronic device according to the present disclosure.

FIG. 7 is a schematic structural diagram of an application embodiment of an electronic device according to the present disclosure. Referring to FIG. 7 below, FIG. 7 is a schematic structural diagram of an electronic device suitable for implementing a terminal device or a server according to the embodiments of the present disclosure. As shown in FIG. 7, a computer system includes one or more processors, a communication part 704, and the like. The one or more processors are, for example, one or more Central Processing Units (CPUs) 701, and/or one or more Graphics Processing Units (GPUs) 702, and the like. The processor may perform various appropriate actions and processing according to executable instructions stored in a Read-Only Memory (ROM) 703 or executable instructions loaded from a storage section 709 to a Random Access Memory (RAM) 705. The communication part 704 may include, but is not limited to, a network card. The network card may include, but is not limited to, an Infiniband (IB) network card. The processor may communicate with the ROM and/or the RAM, to execute executable instructions. The processor is connected to the communication part 704 via a bus, and communicates with other target devices via the communication part 704, thereby implementing corresponding operations of any method provided in the embodiments of the present disclosure. For example, a convolution operation is performed on a to-be-parsed image by using a deep neural network to obtain a first feature map, the first feature map including features of at least one pixel in the image; a pooling operation is performed on the first feature map to obtain at least one second feature map, a size of the second feature map being less than that of the first feature map; and scene parsing is performed on the image according to the first feature map and the at least one second feature map to obtain a scene parsing result of the image, the scene parsing result including a category of the at least one pixel in the image.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to perform corresponding operations of the foregoing communication method. An input/output (I/O) interface 706 is also connected to the bus. The communication part 704 may be integrated, or may be configured to have a plurality of sub-modules (for example, a plurality of IB network cards) connected to the bus.

The following components are connected to the I/O interface: an input section 707 including a keyboard, a mouse and the like; an output section 708 including a Cathode-Ray Tube (CRT), a Liquid Crystal Display (LCD), a speaker and the like; the storage section 709 including a hard disk and the like; and a communication section 710 of a network interface card including an LAN card, a modem and the like. The communication section 710 performs communication processing via a network such as the Internet. A drive 711 is also connected to the I/O interface 706 according to requirements. A removable medium 712 such as a magnetic disk, an optical disk, a magneto-optical disk, a semiconductor memory or the like is mounted on the drive 711 according to requirements, so that a computer program read from the removable medium may be installed on the storage section according to requirements.

It should be noted that, the architecture shown in FIG. 7 is merely an optional implementation. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, a process described above with reference to a flowchart according to the embodiments of this disclosure may be implemented as a computer software program. For example, the embodiments of this disclosure include a computer program product. The computer program product includes a computer program tangibly included in a machine-readable medium. The computer program includes a program code for performing a method shown in the flowchart. The program code may include instructions for performing steps of the method provided in the embodiments of the present disclosure. For example, according to yet another aspect of the embodiments of the present disclosure, a computer storage medium provided is configured to store computer-readable instructions, where the instructions include: an instruction for performing a convolution operation on a to-be-parsed image by using a deep neural network to obtain a first feature map, the first feature map including features of at least one pixel in the image; an instruction for performing a pooling operation on the first feature map to obtain at least one second feature map, a size of the second feature map being less than that of the first feature map; and an instruction for performing scene parsing on the image according to the first feature map and the at least one second feature map to obtain a scene parsing result of the image, the scene parsing result including a category of the at least one pixel in the image. In such an embodiment, the computer program is downloaded and installed from the network through the communication part, and/or is installed from the removable medium. The computer program, when being executed by the CPU, executes the foregoing functions defined in the method of the present disclosure.

In addition, the embodiments of the present disclosure further provide a computer program, including a computer-readable code, where when the computer-readable code runs in a device, a processor in the device executes instructions for implementing the steps of the method for scene parsing according to any one of the embodiments of the present disclosure.

In addition, the embodiments of the present disclosure further provide a computer-readable storage medium configured to store computer-readable instructions, where when the instructions are executed, the operations in the steps of the method for scene parsing according to any one of the embodiments of the present disclosure are implemented.

A person of ordinary skill in the art may understand that all or some steps for implementing the embodiments of the foregoing method may be achieved by a program by instructing related hardware; the foregoing program can be stored in a computer-readable storage medium; when the program is executed, steps including the embodiments of the foregoing method are performed. Moreover, the foregoing storage medium includes various media capable of storing program codes such as ROM, RAM, a magnetic disk, or an optical disk.

The embodiments in the specification are all described in a progressive manner, for same or similar parts in the embodiments, refer to these embodiments, and each embodiment focuses on a difference from other embodiments. The apparatus, system and electronic device embodiments correspond to the method embodiments substantially and therefore are only described briefly, and for the associated part, refer to the descriptions of the method embodiments.

The methods, apparatuses, systems, and electronic devices in the present disclosure may be implemented in numerous manners. For example, the methods, apparatuses, systems, and electronic devices in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe the principles and actual applications of the present disclosure, and to make a person of ordinary skill in the art understand the present disclosure, so as to design various embodiments with various modifications applicable to particular use.

The invention claimed is:

1. A method for scene parsing, comprising:
performing a convolution operation on a to-be-parsed image by using a deep neural network to obtain a first feature map, the first feature map comprising features of at least one pixel in the image;
performing a pooling operation on the first feature map to obtain at least one second feature map, a size of the second feature map being less than that of the first feature map; and
performing scene parsing on the image according to the first feature map and the at least one second feature map to obtain a scene parsing result of the image, the scene parsing result comprising a category of the at least one pixel in the image,
wherein a number of the second feature maps is greater than one, different second feature maps in a plurality of second feature maps having different sizes,
wherein the performing a pooling operation on the first feature map to obtain at least one second feature map comprises:

performing, by using a first pooling layer in the deep neural network, downsampling on the first feature map separately with a plurality of pooling windows having different sizes to obtain a plurality of second feature maps.

2. The method according to claim 1, wherein the sizes of the plurality of second feature maps increase sequentially.

3. The method according to claim 1, before the performing scene parsing on the image according to the first feature map and the at least one second feature map, further comprising at least one of:
performing dimension reduction processing on the second feature map through a convolution layer in the deep neural network; or
performing upsampling on the at least one second feature map separately by using a second pooling layer in the deep neural network to amplify each of the second feature maps to the size of the first feature map.

4. The method according to claim 3, wherein the performing scene parsing on the image according to the first feature map and the second feature map comprises:
connecting the amplified second feature maps to the first feature map by using a connection layer in the deep neural network to obtain a third feature map; and
predicting, based on the third feature map, the category of the at least one pixel in the image by using a classification layer in the deep neural network to obtain a scene parsing result of the image.

5. The method according to claim 1, further comprising:
performing, based on a sample image, network training on an initially set deep neural network model by using an error back propagation method to obtain the deep neural network.

6. The method according to claim 5, wherein the performing, based on a sample image, network training on a deep neural network model by using an error back propagation method comprises:
during a forward propagation process, performing scene parsing detection on a sample image by using a deep neural network model to obtain a first scene parsing prediction result output by an intermediate network layer of the deep neural network model and a second scene parsing prediction result output by a last network layer;
determining a first difference between the first scene parsing prediction result and scene parsing tagging information of the sample image, and a second difference between the second scene parsing prediction result and the scene parsing tagging information of the sample image; and
during a back propagation process, adjusting parameters of a first network layer according to the first difference, and adjusting parameters of a second network layer according to the first difference and the second difference; wherein the first network layer comprises at least one network layer in the deep neural network model that is located between the intermediate network layer and the last network layer, and the second network layer comprises at least one network layer other than the first network layer in the deep neural network model.

7. The method according to claim 6, wherein the intermediate network layer comprises a plurality of network layers in the deep neural network model;
network layers, of which parameters are adjusted, corresponding to different intermediate network layers are different.

8. The method according to claim 6, wherein the number of the network layers of the deep neural network model is N, and the intermediate network layer is an $M^{th}$ layer in the deep neural network model in a forward propagation direction; wherein the value of N is an integer greater than 2, and the value of M is an integer greater than 2 and less than N, or the value of M is an integer greater than N/2 and less than N.

9. The method according to claim 6, wherein the adjusting parameters of each second network layer according to the first difference and the second difference comprises:
determining different weights for the first difference and the second difference; and
adjusting the parameters of the second network layer according to the first difference and the weight thereof as well as the second difference and the weight thereof,
wherein the weight of the first difference is less than the weight of the second difference.

10. The method according to claim 6, wherein:
the intermediate network layer comprises an auxiliary classification layer; and
the first scene parsing prediction result comprises a scene classification prediction result of each pixel in the sample image output by the auxiliary classification layer.

11. The method according to claim 10, further comprising:
removing the auxiliary classification layer after the network training of the deep neural network model is completed.

12. The method according to claim 10, wherein the determining a first difference between the first scene parsing prediction result and scene parsing tagging information of the sample image comprises:
using a first classification cost function layer to obtain a difference between the first scene parsing prediction result and a scene classification prediction result of the at least one pixel in the sample image in the scene parsing tagging information as the first difference; and
removing the first classification cost function layer after the network training of the deep neural network model is completed.

13. The method according to claim 6, wherein the second scene parsing prediction result comprises a scene classification prediction result of the at least one pixel in the sample image output by the last network layer.

14. The method according to claim 13, wherein the determining a second difference between the second scene parsing prediction result and the scene parsing tagging information of the sample image comprises:
using a second classification cost function layer to obtain a difference between the second scene parsing prediction result and the scene classification prediction result of the at least one pixel in the sample image in the scene parsing tagging information as the second difference; and
removing the second classification cost function layer after the network training of the deep neural network model is completed.

15. The method according to claim 6, wherein the performing scene parsing detection on a sample image by using a deep neural network model to obtain a first scene parsing prediction result output by an intermediate network layer of the deep neural network model comprises:
performing a convolution operation on the sample image by using the deep neural network model to obtain a first feature map, the first feature map comprising features of the at least one pixel in the sample image; and according to the first feature map, performing scene parsing detection on the sample image by using the intermediate network layer to obtain a first scene parsing prediction result of the sample image, and outputting the first scene parsing prediction result, the first scene parsing prediction result comprising a category of the at least one pixel in the sample image.

16. The method according to claim 6, wherein the performing scene parsing detection on a sample image by using a deep neural network model to obtain a second scene parsing prediction result output by a last network layer of the deep neural network model comprises:

performing a convolution operation on the sample image by using the deep neural network model to obtain a first feature map, the first feature map comprising features of the at least one pixel in the sample image;

performing a pooling operation on the first feature map to obtain at least one second feature map, a size of the at least one second feature map being less than that of the first feature map; and performing scene parsing detection on the sample image according to the first feature map and the at least one second feature map to obtain a second scene parsing prediction result of the sample image, and outputting the second scene parsing prediction result through the last network layer, the second scene parsing prediction result comprising the category of the at least one pixel in the sample image.

17. A system for scene parsing, comprising:

a memory storing processor-executable instructions; and a processor arranged to execute the stored processor-executable instructions to perform steps of:

performing a convolution operation on a to-be-parsed image to obtain a first feature map, the first feature map comprising features of at least one pixel in the image;

performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result comprising a category of the at least one pixel in the image, wherein a number of the second feature maps is greater than one, different second feature maps in a plurality of second feature maps having different sizes, wherein the performing a pooling operation on the first feature map to obtain at least one second feature map comprises:

performing, by using a first pooling layer in the deep neural network, downsampling on the first feature map separately with a plurality of pooling windows having different sizes to obtain a plurality of second feature maps.

18. A non-transitory computer-readable storage medium having stored thereon computer-readable instructions that, when executed by a processor, cause the processor to execute a method for scene parsing, the method comprising:

performing a convolution operation on a to-be-parsed image by using a deep neural network to obtain a first feature map, the first feature map comprising features of at least one pixel in the image;

performing a pooling operation on the first feature map to obtain at least one second feature map, a size of the second feature map being less than that of the first feature map; and performing scene parsing on the image according to the first feature map and the at least one second feature map to obtain a scene parsing result of the image, the scene parsing result comprising a category of the at least one pixel in the image, wherein a number of the second feature maps is greater than one, different second feature maps in a plurality of second feature maps having different sizes, wherein the performing a pooling operation on the first feature map to obtain at least one second feature map comprises:

performing, by using a first pooling layer in the deep neural network, downsampling on the first feature map separately with a plurality of pooling windows having different sizes to obtain a plurality of second feature maps.

19. The non-transitory computer-readable storage medium according to claim 18, wherein the sizes of the plurality of second feature maps increase sequentially.

20. The system according to claim 17, wherein the sizes of the plurality of second feature maps increase sequentially.

* * * * *